UNITED STATES PATENT OFFICE.

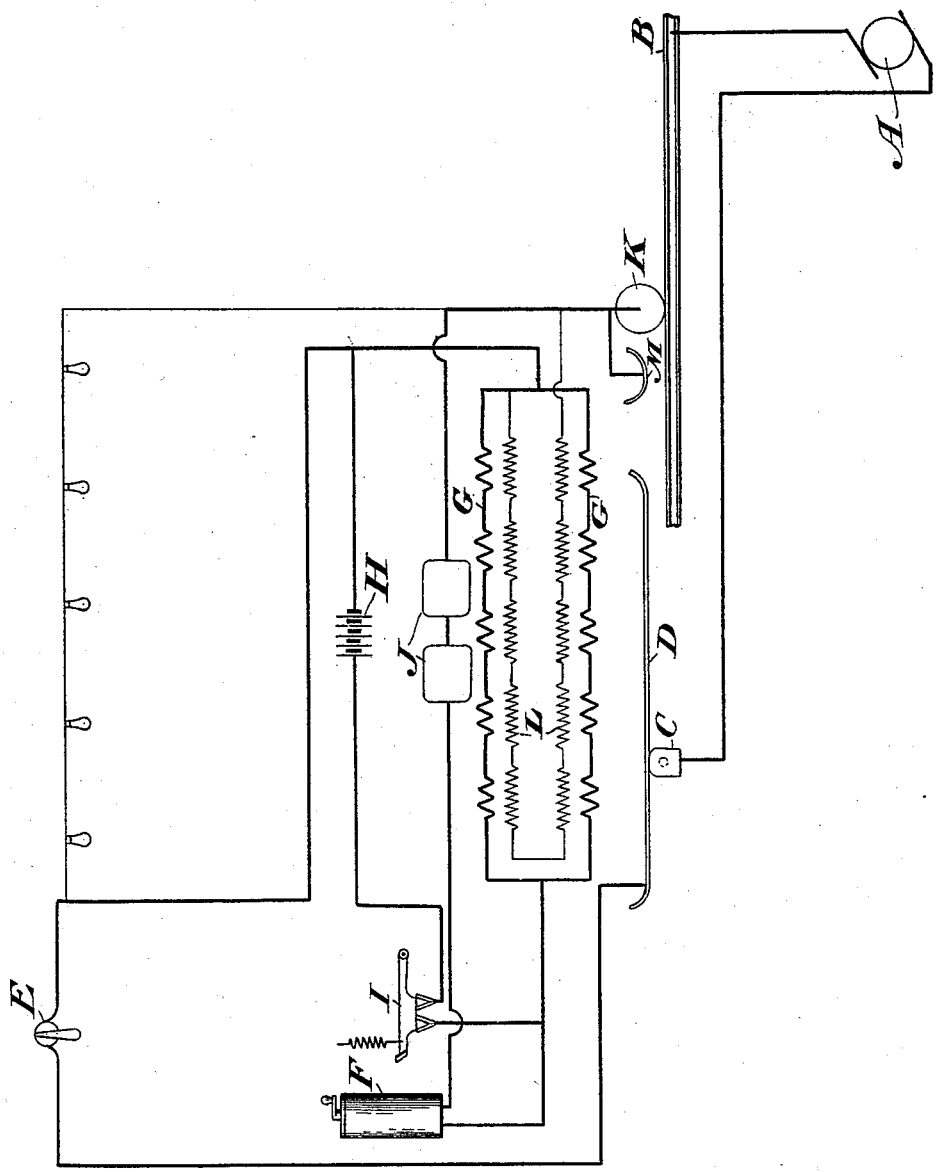

WILLIAM MILTON BROWN, OF JOHNSTOWN, PENNSYLVANIA, ASSIGNOR TO THE JOHNSON COMPANY, OF LORAIN, OHIO.

ELECTRIC SYSTEM OF PROPULSION.

SPECIFICATION forming part of Letters Patent No. 594,379, dated November 30, 1897.

Application filed May 11, 1897. Serial No. 635,934. (No model.)

*To all whom it may concern:*

Be it known that I, WILLIAM MILTON BROWN, of Johnstown, Cambria county, Pennsylvania, have invented certain new and useful Improvements in Electric Systems of Propulsion, of which the following is a specification.

My invention relates to that class of systems in which non-continuous or isolated contacts are interposed on one side of the circuit. The circuit between these contacts and the source of supply is normally an open one, but is temporarily closed by the operation of a circuit-closer actuated by the passage of a vehicle. Such a system has been fully described in a patent issued to me on the 14th of April, 1896, No. 558,151.

My invention is especially adapted for that type of system such as was described in the aforesaid Letters Patent, in which a magnet carried by the traveling vehicle serves to actuate the switching mechanism within the contact-box, and relates to an improved winding of said magnet-coils and the connections from said winding to batteries and switches carried by the car, whereby I am enabled to secure a strong magnet-field regardless of the drop in voltage which may be caused by the large amount of current sometimes needed to start the vehicle from a state of rest, whereby I am enabled to excite the magnet from the batteries at such times as there may be a temporary stoppage of power, whereby I am enabled to charge the batteries at any time by merely closing a switch while I am delivering current to the motors, and whereby I am enabled to completely cut out the current delivered to the magnet-coils whenever the canopy-switch is opened, thus causing no waste of current when the vehicle is left by the operator.

The drawing which accompanies this specification is a diagrammatic view of those parts of the system which are required to illustrate my invention.

A represents the dynamo at the power-station, one terminal of which is connected to the rails B of the track, while the other terminal is connected by intermediate feeders and subfeeders, which are not here shown, to the switching mechanism within the contact-box C. This switching mechanism, as before explained, is ordinarily open, so that no current is delivered to the top of the box; but it is closed by the field of a magnet carried beneath the traveling vehicle.

At D, I show a collecting-shoe, which makes contact with box C only when the aforesaid magnet is above the box. The current from the collecting-shoe D passes to the canopy-switch E, so that when the canopy-switch is opened no current is delivered to any of the circuits upon the vehicle. From E connection is next made in multiple to the controller F through a series winding G for energizing the switch-closing magnet. The other connection from E to F is through the batteries H, which connection is normally kept open by means of the switch I. From the controller F the current passes through the motors J J and their resistances, shunts, &c., which are not here shown, to the ground side of the circuit, which is represented by the car-wheel K.

L represents a shunt-winding for the coils of the magnetic closer.

M represents an auxiliary shoe which is electrically connected to the wheel K.

The passage of the current when the car is traveling under normal conditions would be as follows: from the dynamo A to the contact-box C, through the switching mechanism, which would be closed by the presence of the magnetic closer, to the collecting-shoe D, to the canopy-switch E, thence part would be shunted through the coils L to energize the magnet and part would pass through the low-potential coils G, still further energizing the magnet, the latter part then going through the controller F and the motors J J, returning to the power-house by means of the wheel K and the rail B.

If the car is at rest and there is a high enough resistance in the circuit between the power-house and the part of the line upon which the car is standing to cause a heavy drop in voltage when the car is started, the shunt-coils L may not energize the magnet sufficiently, but the increased amount of current which passes through the motors and causes the said drop in voltage also passes through the coils G and increases their energizing power, so that they will compensate for the loss of power in the coils L.

If the car is at rest and the canopy-switch E is open, so that no current is in either the coils G or L, the switching mechanism within the boxes C would of course be open, and no current could therefore be received by the car. In this event the motorman closes the switch I, which is preferably a foot-switch placed near the operator's position, and a circuit is made through the coils G with the battery H as the source of power. This will energize the magnet sufficiently to close the switching mechanism, and as soon as this is done the switch I may again be opened, the coils L being sufficient to keep the switching mechanism closed.

When the batteries need charging, it is only required that the motorman close the switch I while he is passing current through the controller and motors. In this case the current received by the motors will pass in multiple from E to F through the coils G and the battery H, the latter part of the current serving to charge the batteries.

If the contact portion of the box C from any cause remains alive after the magnet has left the box, the shoe M, coming in contact therewith, will short-circuit the box to the rail B and open a safety device, such as a magnetic circuit-breaker or a fuse, which may be placed at any desired part of the circuit.

I have shown my invention entirely in diagram and do not limit myself to any mechanical construction of the parts thereof. Further, I have shown my invention as applied to a vehicle apparently intended for normal travel in but one direction. It is evident, however, that it will be mere duplication to so arrange the parts that the car could be operated from either end, as is usually done to-day.

It is also clear that I need not limit myself to the exact details shown and described, for the scope of my invention is broader than the specific arrangement by which the invention has been illustrated, and can therefore be readily modified by any one skilled in the art.

Having thus described my invention, what I claim, and desire to protect by Letters Patent, is—

1. In an electromagnet adapted to travel over fixed contacts and close the circuit between said contacts and the source of supply, energizing-coils comprising a winding of comparatively high resistance connected to both sides of the circuit, in combination with a winding of comparatively low resistance placed in series with motors for propelling a vehicle, said windings being adapted to simultaneously coöperate in energizing the magnet.

2. The combination, in an electric system of propulsion, of a vehicle and a magnet carried thereby having energizing-coils consisting of one winding of comparatively high resistance and one of comparatively low resistance, said windings being so connected to the circuits that current passes through both windings simultaneously when a circuit is established through the motors.

3. In an electrically-propelled vehicle, a magnet carried thereby having energizing-coils comprising two distinct sets of windings, one winding being in shunt with the motors carried by said vehicle, and the other winding being in series with said motors.

4. The combination of an electrically-propelled vehicle, motors carried thereby, an electromagnetic closer also carried thereby, and an energizing-coil for said closer in series with the motors and connected through a switch to the terminals of an independent source of electric supply carried by the vehicle.

5. The combination upon a vehicle, of motors for propelling the same, storage batteries and a switch in circuit therewith, an electromagnetic closer carried by said vehicle, and energizing-coils for said closer comprising two sets of windings, one of said windings being in series with said motors, and connected when the said switch is closed, to the terminals of the storage batteries, the other of said windings being in shunt with the motors.

6. The combination upon an electrically-propelled vehicle, of contact-makers D and K, motors, a controller, storage batteries and a switch therefor, an electromagnetic closer and coils therefor having two distinct windings G and L, connections from one of said contact-makers through the motors to the controller, and connections from the other of said contact-makers either through said winding G to the controller, or, when said battery-switch is closed, through coil G and the batteries in multiple to the controller.

In testimony whereof I have affixed my signature in presence of two witnesses.

WILLIAM MILTON BROWN.

Witnesses:
 ERNEST G. THOMPSON,
 J. WALTER THOMPSON.